United States Patent [19]

Thomas

[11] Patent Number: 5,526,195
[45] Date of Patent: Jun. 11, 1996

[54] REAR-VIEW SYSTEM FOR VEHICLES

[75] Inventor: Justin M. Thomas, Surrey, Great Britain

[73] Assignee: Optical Perspectives Ltd., Surrey, United Kingdom

[21] Appl. No.: 232,175

[22] PCT Filed: Oct. 7, 1992

[86] PCT No.: PCT/GB92/01828

§ 371 Date: Apr. 29, 1994

§ 102(e) Date: Apr. 29, 1994

[87] PCT Pub. No.: WO93/09007

PCT Pub. Date: May 13, 1993

[30] Foreign Application Priority Data

Oct. 31, 1991 [GB] United Kingdom ............... 9123075

[51] Int. Cl.$^6$ ................ G02B 5/08; G02B 5/10; G02B 17/00; G02B 3/00
[52] U.S. Cl. ............ 359/850; 359/854; 359/857; 359/837; 359/731; 359/737; 359/851; 359/863
[58] Field of Search ................... 359/850, 854, 359/857, 837, 867, 866, 853, 726, 727, 729, 731, 861, 737

[56] References Cited

U.S. PATENT DOCUMENTS

| | | |
|---|---|---|
| 2,338,488 | 1/1944 | Brown .................. 359/726 |
| 3,179,797 | 4/1965 | Franck .................. 359/837 |
| 3,864,025 | 2/1975 | Picardat ................. 359/726 |
| 3,972,596 | 8/1976 | Baumgardner et al. ..... 359/737 |
| 4,274,714 | 6/1981 | Okamura ................. 359/726 |
| 4,986,631 | 1/1991 | Aoki et al. .............. 359/857 |
| 5,002,375 | 3/1991 | Komplin et al. .......... 359/737 |

FOREIGN PATENT DOCUMENTS

| | | |
|---|---|---|
| 0085479 | 8/1983 | European Pat. Off. . |
| A0283467 | 9/1988 | European Pat. Off. . |
| 2575710 | 4/1985 | France .......... B60R 1/02 |
| A2400697 | 7/1975 | Germany . |
| A3146486 | 6/1983 | Germany . |
| 1370376 | 10/1974 | United Kingdom . |
| 1405188 | 9/1975 | United Kingdom . |
| A9006866 | 6/1990 | WIPO . |

*Primary Examiner*—Paul M. Dzierzynski
*Assistant Examiner*—Mohammad Y. Sikder
*Attorney, Agent, or Firm*—Lowe, Price, LeBlanc & Becker

[57] ABSTRACT

A rear view system for a vehicle (10) includes in combination a light transmitting member (2) and a light reflective medium (16) spatially displaced from the member. The member has a first face (4) for light emergence from which in use light rays are directed towards the medium (16) and a second face (6) for light incidence, each face being disposed on a respective side of a median plane (8). The member (2) comprises a plurality of elemental prismatic sections, the prismatic angles of the elemental sections progressively changing along the length of the member whereby rays of refracted light emerging through the first face are in parallelism or substantial parallelism one with the other irrespective of the angles of incidence of the rays. The shape of the light transmitting member (2) is such as to afford a wide angular scope of view to the system thereby to enhance safety.

20 Claims, 3 Drawing Sheets

REAR-VIEW SYSTEM FOR VEHICLES

BACKGROUND OF THE INVENTION

1. Field of Invention

This invention concerns improvements in or relating to rear view systems for vehicles and vehicles incorporating such systems.

In particular, although not exclusively, the present invention has reference to such a system suitable for use on motorised road vehicles.

2. Description of Related Art

Conventionally, a motorized road vehicle is provided with an internally mounted rear view mirror to give the driver a central vision through the rear window, and either wing or door mounted mirrors to give marginal vision to the rear and, in a narrow path, adjacent the side of the vehicle. For reasons of safety, it is desirable to afford the driver of the vehicle with as comprehensive as possible a view of the prevailing ambient driving conditions. It is known therefore to enhance the vision through the rear window by making the mirror convex to provide a panoramic view, but clearly the degree to which such can be achieved depends upon the vehicle body configuration and invariably the view is impaired by opaque parts of the body structure. Additionally, or in the alternative, it has been proposed to locate a prismatic lens at the rear of a vehicle, more especially a commercial vehicle, such that images of objects immediately to the rear of the vehicle are transmitted to the driver through the agency of a mirror. Similarly, endeavours have been made to improve the vision given by side mirrors, for example by adding a small convex mirror section in one corner in an attempt to give a wider viewing spectrum. However, the image is inevitably small which necessarily militates against the alleged advantage of providing a vision of greater breadth.

It is further known to provide side mirrors combined in close juxtaposition with prismatic arrangements for refracting light rays from objects to the rear of the vehicle, but the images of the mirrors necessitate diversion of the driver's eyes from the path ahead, and in any event tend not to widen the viewing scope.

SUMMARY OF INVENTION

It is an object of the present invention to provide a rear view system for a vehicle having the capacity of facilitating inspection of the rear vista and for capturing a wider field of view than possible with conventional or known systems.

It is a further object of the invention to provide a vehicle incorporating such a rear view system.

According to a first aspect of the invention a rear view system for a vehicle includes in combination a light transmitting member and a light reflective medium spatially displaced from the member, the member presenting a first face for light emergence from which in use light rays are directed towards the medium and a second face for light incidence, each face being disposed on a respective side of a median plate, the member comprising a plurality of elemental prismatic sections, the prismatic angles of the elemental sections progressively changing along the length of the member whereby rays of refracted light emerging through the first face are in parallelism or substantial parallelism one with the other irrespective of the angles of incidence of the rays.

Advantageously, the member is so designed to ensure that the incident rays undergo essentially minimum deviation through the prismatic elemental sections.

Conveniently the shape of the first face of the member is generated by a locus of points calculated by the following formulae wherein the 'y' axis is aligned along the median plane and the 'x' axis extends orthogonally thereto:

$$x_n = \sin\left[(A_n + d_n)/2\right] \cdot f_n / \cos(A_n/2) + x_{n-1} \quad (1)$$

$$y_n = \cos\left[(A_n + d_n)/2\right] \cdot f_n / \cos(A_n/2) + y_{n-1} \quad (2)$$

Similarly the shape of the second face of the member is generated by a locus of points calculated by the following formulae wherein the 'y' axis is aligned along the median plane and the 'x' axis extends orthogonally thereto:

$$x_n = \left[\sin\{(A_n - d_n)/2\}\right] \cdot \left[f_n + \sin\{(d_n - d_{n-1})/2\} \cdot W_{n-1}\right]/\cos(A_n/2) + x_n \quad (3)$$

$$y_n = \left[\cos\{(A_n - d_n)/2\}\right] \cdot \left[f_n + \sin\{(d_n - d_{n-1})/2\} \cdot W_{n-1}\right]/\cos(A_n/2) + y_n \quad (4)$$

In the above formulae, the symbols used except where indicated otherwise have the following meanings or values:

$A$ = the prismatic angle $\quad d$ = deviation $f_n$ = the correction factor = $(y_{n-1} - y_{n-2})$ 2nd side/ $(y_{n-1} - y_{n-2})$ 1st side $W_n$ = width of member = $\tan(A/2) \cdot \{2 \cdot f_n + W_{n-1} \cdot \sin[(d_n - d_{n-1})/2]\} + W_{n-1} \cdot \cos[(d_n - d_{n-1})/2]$ $n$ = the number of the element $W_o$ = $2(\pm x)$ at the narrowest part of the member In practice the member is of substantially concavo-convex form with the concave surface constituting the first face. The other surface constituting the second face has contiguous concave and convex parts extending in the direction of the median plane. The first and second faces progressively diverge from one another with the increasing prismatic angle of the elemental sections, $W_n$ giving the varying width of the member. The first face may be angularly disposed in relation to the median plane in order in use to project emergent rays in any desired direction onto the light reflective medium. The ends of the member may be planar or of any convenient shape.

The length of the member from its smallest width to its largest width is chosen to give the broadest spectrum of image capture, and a particular and unique advantage of the present invention resides in the angular scope which the configuration of the member affords. The angular scope extends from 0° on a line perpendicular to the median plane to approximately 90° thereto.

The depth of the member may be costed dependent upon the individual requirements.

The light reflective medium may conveniently be a mirror of any suitable profile and shape, for example it may be plane, concave or convex, but the medium may in the alternative be prismatic and suitably oriented to reflect incident light towards a viewer.

According to a second aspect of the invention a vehicle including a driving position and a rear view system according to the first aspect wherein the light transmitting member is located to one side of the direct forward line of sight of the driving position, and the light reflective member is located in or adjacent the direct line of sight of the driving position.

The vehicle is preferable provided with means for positively directing or collimating the rays emerging from the first face of the light transmitting member onto the light reflective member.

The vehicle may be a road vehicle, motorised or manually powered, and more particularly, but not especially, is an automobile, in which case a light transmitting member is located on a respective front door in the manner of a conventional side mirror.

Alternatively, the light transmitting member may be located in a suitable position on the vehicle body. The member may be held within a housing and the housing may be integral with the door or mounted thereon, and may be streamlined. It is to be understood, however, that the light transmitting member is inherently streamlined and thus may be mounted on the vehicle in an appropriate manner without the need for a housing.

The light reflective member may conveniently be disposed on or in the dashboard of an automobile for ease of visibility, but any other suitable position may be selected to give the driver of the vehicle direct and unimpaired vision of the images transmitted by the member without the necessity of moving his head.

When located on a vehicle because of the angular scope of the light transmitting member, the sweep of vision given to the driver is from a point orthogonal to the driving position, which is normally a blind spot with conventional rear view systems, to a point directly to the rear of the vehicle. In this latter respect, the member may conveniently be disposed as to capture part of the vehicle body to provide a reference image for the driver to facilitate the judgement of distances and accordingly the proximity of other vehicles or objects. In view of the wide angular scope afforded by the rear view system, it can be a special feature of the invention that the light transmitting member may be of static form without the facility to change its orientation by the use of electronic components which make conventional mirrors expensive and troublesome to maintain. However, it is within the scope of this invention to provide means for changing the orientation of the member.

The light reflecting medium may be orientable to suit the needs of the individual driver or in the alternative it may be fixed in position.

Whilst the principal field of application of the present invention is for automobiles, it is to be understood that the expression 'vehicle' is not to be limiting and accordingly will embrace any conveyance or mobile structure requiring a rear viewing facility. Thus for example the invention may also be utilised in aircraft or shipping where comprehensive vision of the ambient conditions is desirable, if not essential.

By way of example only, one form or rear view system according to the invention is illustrated in graphical form in the accompanying drawings,

DESCRIPTION OF PREFERRED EMBODIMENT(S)

Figure 1:
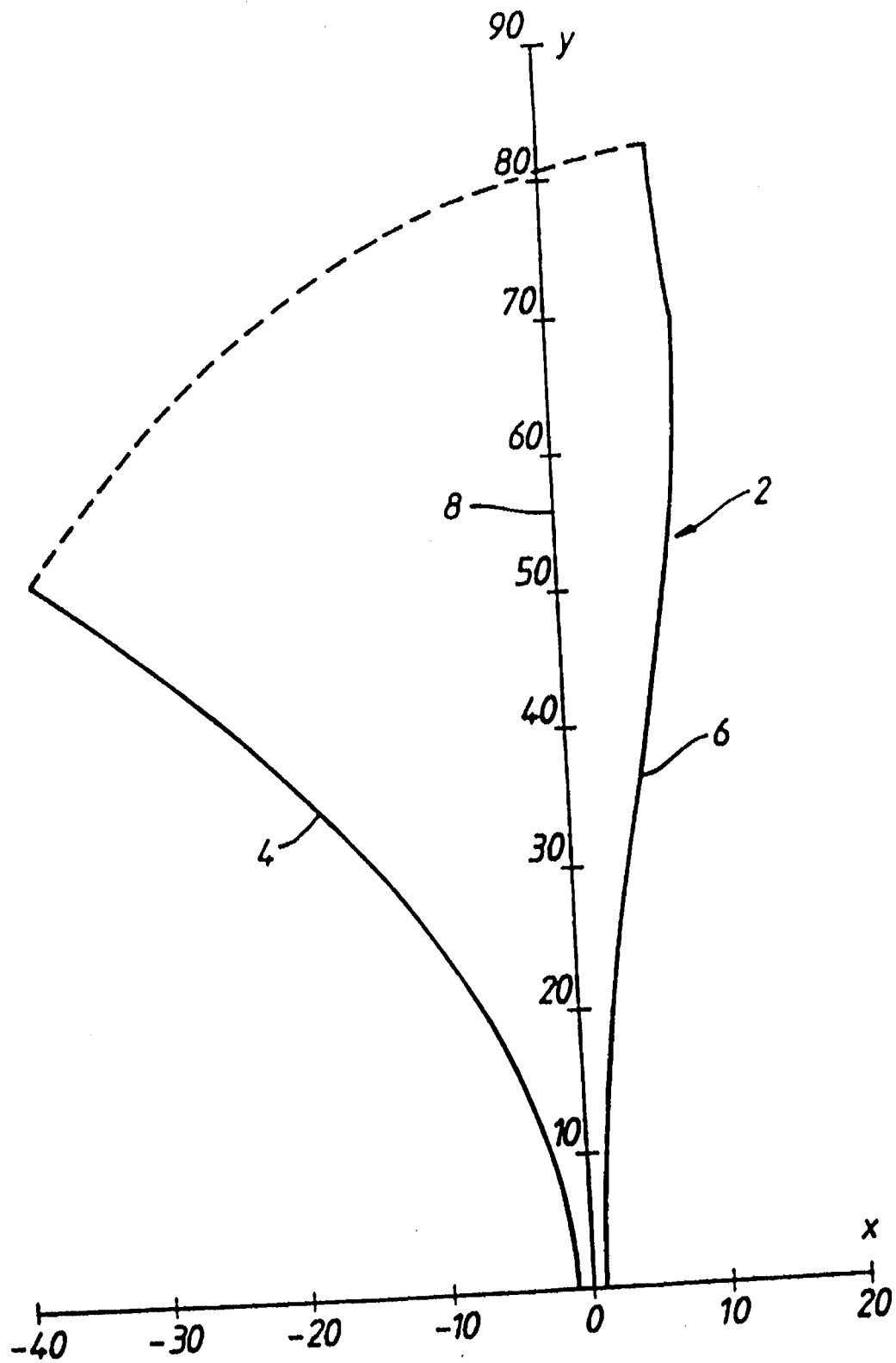
FIG. 1 is a plan view of the light transmitting member shown against an x,y plot.
Figure 2:
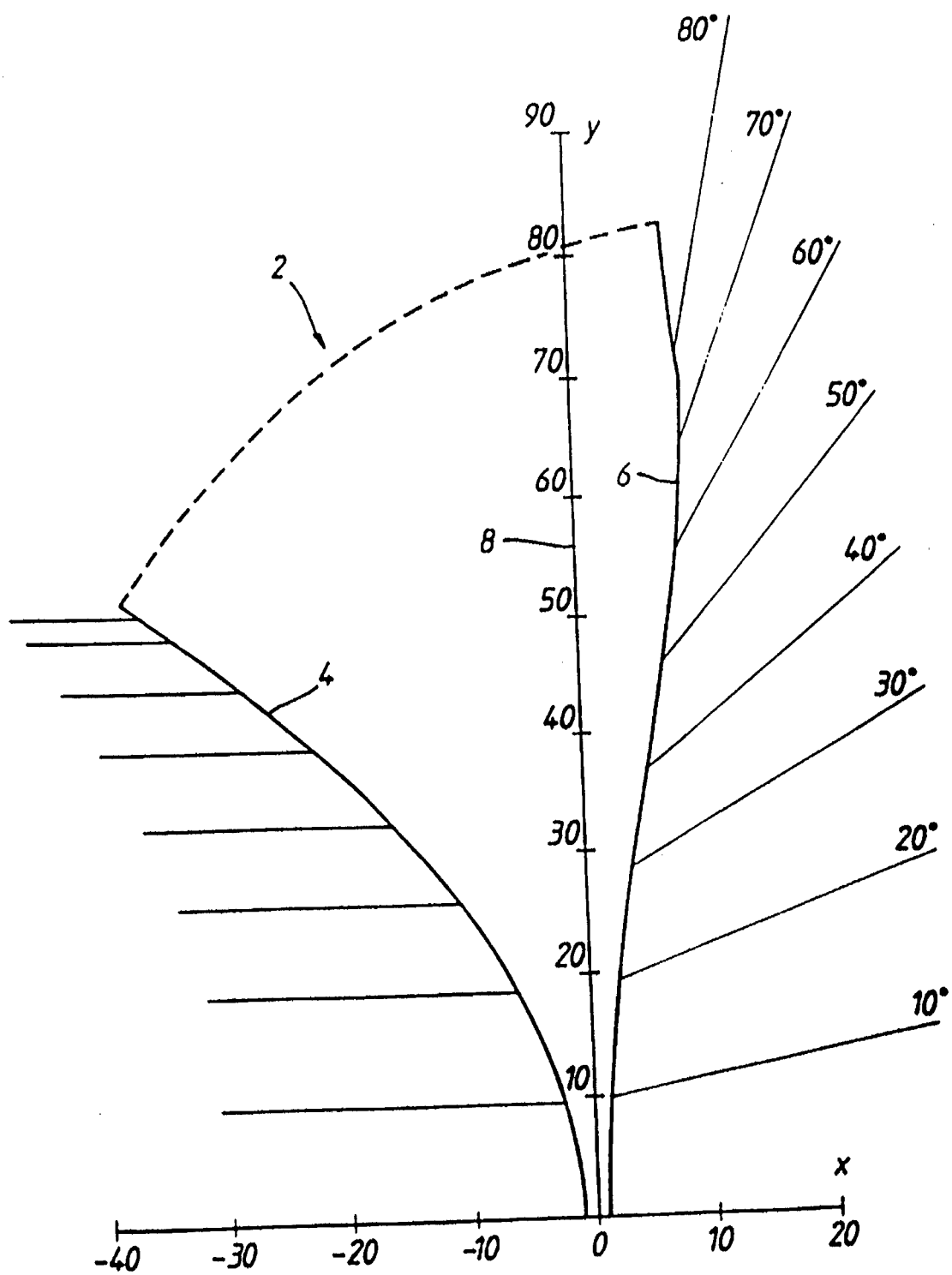
FIG. 2 is a plan view corresponding to FIG. 1 and showing the light transmitting member in plan with the incident and emergent light paths.

With reference to FIGS. 1 and 2 of the drawings, a rear view system 1 includes a mirrorless light transmitting means 2 having a first face 4 through which refracted light emerges and a second face 6 for light incidence, the faces being disposed either side of a median plane 8. As can be seen from the illustrations, the member is substantially concavo-convex in form and its faces are generated as the loci of points calculated in accordance with the following formulae with the 'y' axis coincident with the median plane. The first face 4 is substantially concave in shape whereas the face 6 presents a combined concave/convex profile in which a part of the face is concave and a contiguous part is convex.

For the first face 4:

$$x_n = \sin[(A_n + d_n)/2] \cdot f_n / \cos(A_n/2) + x_{n-1} \quad (1)$$

$$y_n = \cos[(A_n + d_n)/2] \cdot f_n / \cos(A_n/2) + y_{n-1} \quad (2)$$

For the second face 6:

$$x_n = [\sin\{(A_n - d_n)/2\}] \cdot [f_n + \sin\{(d_n - d_{n-1})/2\} \cdot W_{n-1}]/\cos(A_n/2) + x_n \quad (3)$$

$$y_n = [\cos\{(A_n - d_n)/2\}] \cdot [f_n + \sin\{(d_n - d_{n-1})/2\} \cdot W_{n-1}]/\cos(A_n/2) + y_n \quad (4)$$

In the above formulae, the symbols used except where indicated otherwise have the following meanings of values:

$A$ = the prismatic angle  $d$ = deviation $f_n$ = the correction factor = $(y_{n-1} - y_{n-2})$ 2nd side/ $(y_{n-1} - y_{n-2})$ 1st side $Wn$ = width of member = $\tan(A/2) \cdot \{2 \cdot f_n + W_{n-1} \cdot \sin[(d_n - d_{n-1})/2]\} + W_{n-1} \cdot \cos[(d_n - d_{n-1})/2]$ $n$ = the number of the element $W_o = 2(\pm x)$ at the narrowest part of the member In this example, values for the x,y coordinates for both faces have been calculated over a full range of prismatic angles from 0° to 82° at 2° intervals and the results are shown in the accompanying table for which the key is provided at its foot. Additionally, the material from which the member is formed is crown glass having a refractive index of 1.523.

As will more particularly be seen from FIG. 2, the angles of incidence of rays on face 6 vary from 10° to 80° as shown; the rays are refracted by the member undergoing minimum deviation to emerge through face 4 in substantial parallelism to give an image. The emergent rays are directed towards a light reflecting medium (not shown) which in this example is a plane mirror spatially displaced from face 4 of the member.

Figure 3:
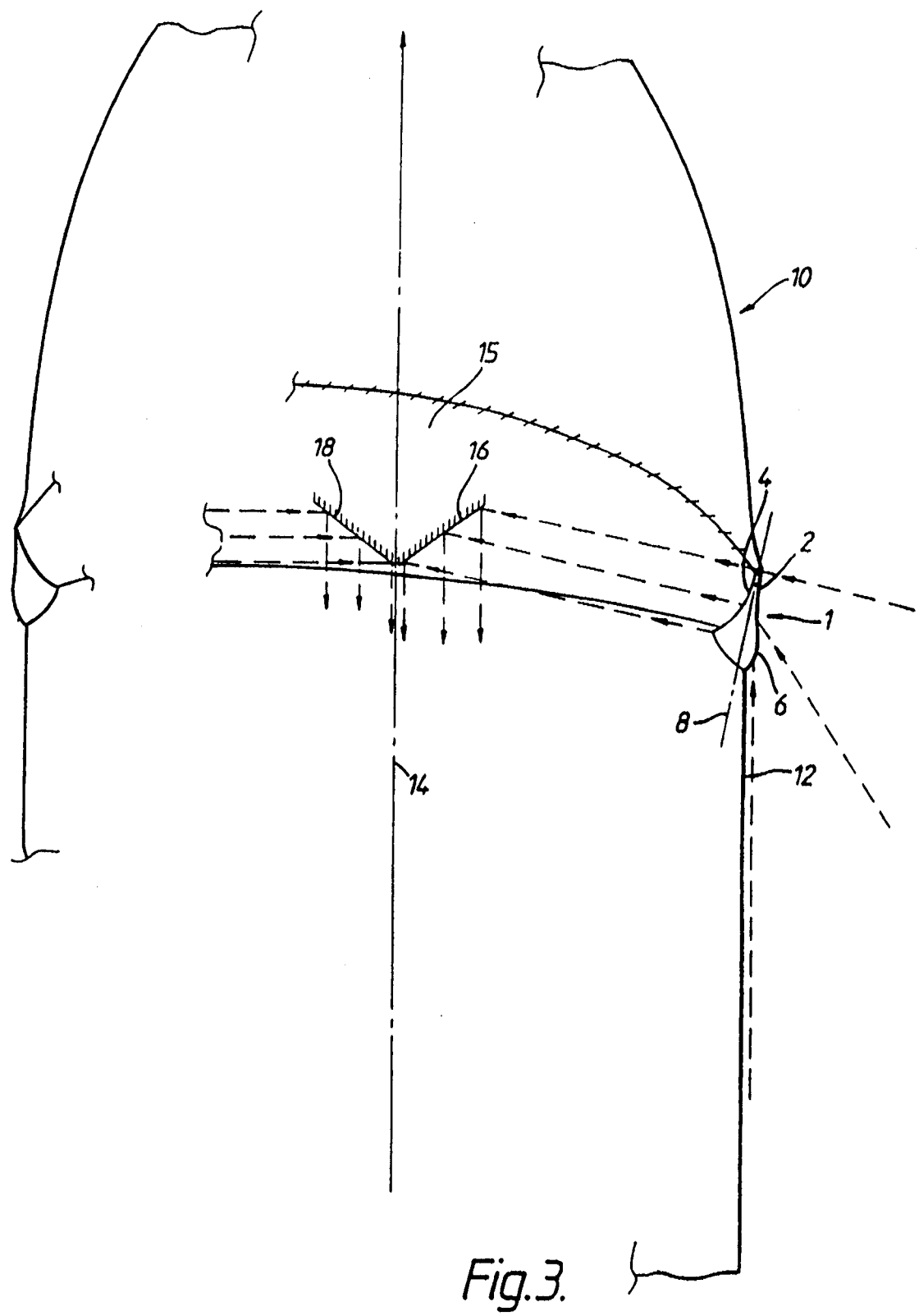
FIG. 3 is plan view of a part of a vehicle shown in diagrammatic form with the rear view system mounted thereon.

Referring not to FIG. 3, when the rear view system 1 is employed on an automobile generally depicted at 10, the member 2 is mounted on the door 12 adjacent a driving position 14, and a mirror 16 is located on or in the dashboard 15 directly in front of the driving position as shown. A further member 2 (not shown) is mounted on the passenger door (not shown) and is disposed so as to direct rays emerging from its face 4 to a further mirror 18 located adjacent mirror 16 thereby to provide the driver with a comprehensive view from both sides of the automobile 10 which does not require lateral movement of the head, whilst providing a wider image capture than that hitherto available with conventional side mirrors.

The principal advantage of the present invention is that the driver of a vehicle is provided with a more comprehensive picture of the ambient conditions than is possible with conventional mirrors or known devices, and thus the safety of driving is considerably enhanced, particularly by removing blind spots normally associated with existing systems.

Whilst the present invention has been specifically described in relation to a mirrorless light transmitting means manufactured from crown glass, it is to be understood that other materials or media may be used therefor and the refractive index will vary accordingly.

It is also to be understood that the invention can be made in kit form for retrofitting to existing vehicles.

TABLE

| A | | Devn. | | | | | First side | | Second side | |
|---|---|---|---|---|---|---|---|---|---|---|
| Ref. ind = 1.2 | r | i | δ | ldg. edge | tr. edge | W | x | y | x | y |
| 0.0 | 0.0 | 0.000 | 0.000 | 0.000 | 0.000 | 2.000 | -1.000 | 0.000 | 1.000 | 0.000 |
| 2.0 | 1.0 | 1.523 | 1.046 | 0.477 | 1.523 | 2.035 | -1.027 | 1.000 | 1.008 | 1.018 |
| 4.0 | 2.0 | 3.047 | 2.094 | 0.953 | 3.047 | 2.107 | -1.081 | 2.018 | 1.026 | 2.055 |
| 6.0 | 3.0 | 4.572 | 3.144 | 1.428 | 4.572 | 2.214 | -1.162 | 3.036 | 1.052 | 3.092 |
| 8.0 | 4.0 | 6.099 | 4.197 | 1.901 | 6.099 | 2.358 | -1.271 | 4.054 | 1.086 | 4.131 |
| 10.0 | 5.0 | 7.628 | 5.256 | 2.372 | 7.628 | 2.539 | -1.406 | 5.073 | 1.129 | 5.172 |
| 12.0 | 6.0 | 9.160 | 6.321 | 2.840 | 9.160 | 2.756 | -1.570 | 6.093 | 1.181 | 6.217 |
| 14.0 | 7.0 | 10.697 | 7.393 | 3.303 | 10.697 | 3.010 | -1.761 | 7.115 | 1.241 | 7.264 |
| 16.0 | 8.0 | 12.237 | 8.475 | 3.763 | 12.237 | 3.302 | -1.981 | 8.138 | 1.311 | 8.317 |
| 18.0 | 9.0 | 13.783 | 9.567 | 4.217 | 13.783 | 3.633 | -2.229 | 9.163 | 1.389 | 9.374 |
| 20.0 | 10.0 | 15.335 | 10.670 | 4.665 | 15.335 | 4.003 | -2.506 | 10.190 | 1.475 | 10.438 |
| 22.0 | 11.0 | 16.894 | 11.788 | 5.106 | 16.894 | 4.413 | -2.813 | 11.220 | 1.571 | 11.509 |
| 24.0 | 12.0 | 18.460 | 12.921 | 5.540 | 18.460 | 4.864 | -3.149 | 12.254 | 1.676 | 12.589 |
| 26.0 | 13.0 | 20.035 | 14.071 | 5.965 | 20.035 | 5.357 | -3.517 | 13.290 | 1.790 | 13.677 |
| 28.0 | 14.0 | 21.620 | 15.240 | 6.380 | 21.620 | 5.894 | -3.915 | 14.332 | 1.913 | 14.777 |
| 30.0 | 15.0 | 23.215 | 16.430 | 6.785 | 23.215 | 6.476 | -4.346 | 15.377 | 2.045 | 15.888 |
| 32.0 | 16.0 | 24.822 | 17.643 | 7.178 | 24.822 | 7.105 | -4.810 | 16.429 | 2.186 | 17.013 |
| 34.0 | 17.0 | 26.441 | 18.883 | 7.559 | 26.441 | 7.783 | -5.309 | 17.486 | 2.338 | 18.154 |
| 36.0 | 18.0 | 28.075 | 20.151 | 7.925 | 28.075 | 8.511 | -5.843 | 18.551 | 2.499 | 19.312 |
| 38.0 | 19.0 | 29.725 | 21.450 | 8.275 | 29.725 | 9.293 | -6.413 | 19.623 | 2.670 | 20.490 |
| 40.0 | 20.0 | 31.392 | 22.785 | 8.608 | 31.392 | 10.132 | -7.022 | 20.704 | 2.852 | 21.690 |
| 42.0 | 21.0 | 33.079 | 24.158 | 8.921 | 33.079 | 11.030 | -7.671 | 21.794 | 3.044 | 22.915 |
| 44.0 | 22.0 | 34.787 | 25.574 | 9.213 | 34.787 | 11.992 | -8.362 | 22.896 | 3148 | 24.169 |
| 46.0 | 23.0 | 36.519 | 27.037 | 9.481 | 36.519 | 13.021 | -9.098 | 24.011 | 3.463 | 25.455 |
| 48.0 | 24.0 | 38.277 | 28.553 | 9.723 | 38.277 | 14.125 | -9.880 | 25.140 | 3.689 | 26.779 |
| 50.0 | 25.0 | 40.064 | 30.129 | 9.936 | 40.064 | 15.307 | -10.713 | 26.285 | 3.928 | 28.144 |
| 52.0 | 26.0 | 41.885 | 31.770 | 10.115 | 41.885 | 16.575 | -11.598 | 27.449 | 4.181 | 29.558 |
| 54.0 | 27.0 | 43.743 | 33.486 | 10.257 | 43.743 | 17.938 | -12.542 | 28.633 | 4.447 | 31.028 |
| 56.0 | 28.0 | 45.644 | 35.287 | 10.356 | 45.644 | 19.406 | -13.547 | 29.841 | 4.727 | 32.563 |
| 58.0 | 29.0 | 47.592 | 37.185 | 10.408 | 47.592 | 20.990 | -14.619 | 31.077 | 5.023 | 34.174 |
| 60.0 | 30.0 | 49.597 | 39.193 | 10.403 | 49.597 | 22.705 | -15.766 | 32.344 | 5.335 | 35.874 |
| 62.0 | 31.0 | 51.665 | 41.331 | 10.335 | 51.665 | 24.568 | -16.994 | 33.647 | 5.665 | 37.681 |
| 64.0 | 32.0 | 53.810 | 43.621 | 10.190 | 53.810 | 26.602 | -18.313 | 34.992 | 6.012 | 39.615 |
| 66.0 | 33.0 | 56.046 | 46.092 | 9.954 | 56.046 | 28.836 | -19.735 | 36.387 | 6.379 | 41.704 |
| 68.0 | 34.0 | 58.392 | 48.783 | 9.608 | 58.392 | 31.305 | -21.274 | 37.842 | 6.765 | 43.987 |
| 70.0 | 35.0 | 60.875 | 51.749 | 9.125 | 60.875 | 34.060 | -22.947 | 39.367 | 7.171 | 46.513 |
| 72.0 | 36.0 | 63.534 | 55.067 | 8.466 | 63.534 | 37.169 | -24.780 | 40.979 | 7.594 | 49.357 |
| 74.0 | 37.0 | 66.429 | 58.858 | 7.571 | 66.429 | 40.733 | -26.805 | 42.700 | 8.030 | 52.631 |
| 76.0 | 38.0 | 69.661 | 63.322 | 6.339 | 69.661 | 44.914 | -29.068 | 44.563 | 8.462 | 56.523 |
| 78.0 | 39.0 | 73.427 | 68.853 | 4.573 | 73.427 | 50.000 | -31.644 | 46.621 | 8.851 | 61.384 |
| 80.0 | 40.0 | 78.228 | 76.455 | 1.772 | 78.228 | 56.636 | -34.664 | 48.970 | 9.058 | 68.071 |
| 82.0 | 41.0 | 87.677 | 93.353 | -5.677 | 87.677 | 68.204 | -38.432 | 51.865 | 7.686 | 81.875 |

Key to table of figures:
Col. 1 A = angle of prism
Col. 2 r = angle of refraction (= 0.5 A)
Col. 3 i = angle of incidence (i = arcsin (Ref ind. sinr))
Col. 4 devn. = δ = 2i−2r
Col. 5 ldg. edge = 0.5 (A − δ)
Col. 6 tr. edge = 0.5 (A + δ)

I claim:

1. A motorized road vehicle having a driving position (14) and a rear view system which comprises in combination:
    a) a prismatic lens located at a front side door position of the vehicle and having a first portion with a concave first face for light emergence, and having a second portion with a convex second face for light incidence, each face being disposed on a respective side of a median plane, the second face being arranged to capture rays of light incident from a rear and from a side of the vehicle, and each of the first face and the second face having angles of curvature which progressively change along the length of the lens, wherein rays of light emerge through the first face parallel or substantially parallel one with the other irrespective of the angle of incidence of the rays, and are directed by said first face across a portion of the vehicle interior; and
    b) a light reflective member separated by a distance from said prismatic lens, and directly in or adjacent to the direct forward line of sight of a driving position, wherein said directed rays of light pass directly from the first face to the light reflective member and are reflected by the light reflective member for viewing by a driver.

2. The vehicle of claim 1, wherein a forward end of the lens has first and second faces disposed so that light passes substantially undeviated from a side of the vehicle to the light reflective member.

3. A vehicle according to claim 1, wherein the lens has first and second faces arranged so that the rays of light undergo essentially minimum deviation through the lens.

4. A vehicle according to claim 1, in which the shape of the first face of the member is generated by a locus of points calculated by the following formulae wherein the 'y' axis is aligned along the median plane and the 'x' axis extends orthogonally thereto:

$$x_n = \sin[(A_n + d_n)/2] \cdot f_n/\cos(A_n/2) + x_{n-1}$$

$$y_n = \cos[(A_n + d_n)/2] \cdot f_n/\cos(A_n/2) + y_{n-1}$$

wherein $A$ = the prismatic angle    $d$ = deviation $f_n$ = the correction factor = $(y_{n-1} - y_{n-2})$ 2nd side/ $(y_{n-1} - y_{n-2})$ 1st side $Wn$ = width of member = $\tan(A/2) \cdot \{2 \cdot f_n + W_{n-1} \cdot \sin[(d_n - d_{n-1})/2]\} + W_{n-1} \cdot \cos[(d_n - d_{n-1})/2]$ $n$ = the number of the element $W_o = 2(\pm x)$ at the narrowest part of the member.

5. A vehicle according to claim 1, in which the shape of the second face of the member is generated by a locus of points calculated by the following formulae wherein the 'y' axis is aligned along the median plane and the 'x' axis extends orthogonally thereto:

$$x_n = [\sin\{(A_n - d_n)/2\}] \cdot [f_n + \sin\{(d_n - d_{n-1}/2\} \cdot W_{n-1}]/\cos(A_n/2) + x_n$$

$$y_n = [\cos\{(A_n - d_n)/2\}] \cdot [f_n + \sin\{(d_n - d_{n-1}/2\} \cdot W_{n-1}]/\cos(A_n/2) + y_n$$

wherein $A$ = the prismatic angle    $d$ = deviation $f_n$ = the correction factor = $(y_{n-1} - y_{n-2})$ 2nd side/ $(y_{n-1} - y_{n-2})$ 1st side $Wn$ = width of member = $\tan(A/2) \cdot \{2 \cdot f_n + W_{n-1} \cdot \sin[(d_n - d_{n-1})/2]\} + W_{n-1} \cdot \cos[(d_n - d_{n-1})/2]$ $n$ = the number of the element $W_o = 2(\pm x)$ at the narrowest part of the member.

6. A vehicle according to claim 1, in which the light reflective member is a mirror.

7. A vehicle according to claim 1, in which the first face is angularly oriented relative to the median plane.

8. A vehicle according to claim 1, in which a a second prismatic lens is located on a a second front side door of the vehicle.

9. A vehicle according to claim 1, including means for positively directing the rays emerging from the first face of the lens onto the light reflective member.

10. A vehicle according to claim 1, in which the lens is integral with the door.

11. A vehicle according to claim 10, in which the lens is streamlined.

12. A vehicle according to claim 1, in which the light reflective member is disposed on or in a dashboard of the vehicle for ease of visibility.

13. A vehicle according to claim 1, in which the light reflective member is orientable.

14. A rear view system for a motorized road vehicle which comprises in combination:

a) a prismatic lens adapted for mounting on a front side door of the vehicle and having a first portion with a concave first face for light emergence and a second portion with a convex second face for light incidence, each face being disposed on a respective side of a median plane, the second face being arranged to capture rays of light incident from a rear and from a side of the vehicle, and each of the first face and the second face have angles of curvature which progressively change along the length of the lens, wherein rays of light pass directly from said second portion to said first portion, emerge from the first face parallel or substantially parallel one with the other irrespective of the angle of incidence of the rays, and are directed by said first face across a portion of the vehicle interior; and b) a light reflective member separated by a distance from said prismatic lens, and adapted for mounting directly in or adjacent to the direct forward line of sight of a driving position, wherein said directed rays of light pass in a substantially straight line from the first face to the light reflective member and are reflected by the light reflective member for viewing by a driver.

15. A vehicle rear vision system comprising:

a mirrorless light transmitting means, located on a right side or left side of a vehicle, for collecting light rays representing an object located a distance from said side of the vehicle; and a reflective device, separated by a distance from said light transmitting means and disposed in a direct forward line of sight of a vehicle operator, for directly receiving said light rays from the light transmitting means and for reflecting said light rays to be within the direct forward line of sight of the vehicle operator;

wherein said light rays are directed by said light transmitting means to said reflective device in a substantially straight line.

16. A vehicle rear vision system according to claim 15, wherein said mirrorless light transmitting means is a prismatic lens and said reflective device is a mirror.

17. A vehicle rear vision system according to claim 15, wherein said reflective device includes a mirror and the system includes only a single reflective device.

18. A vehicle rear vision system according to claim 15, further comprising:

a second mirrorless light transmitting means, located on another side of the vehicle and separated by a distance from said reflective device, for collecting second light rays representing an object located a distance from said another side of the vehicle;

wherein said second light rays are directed by said second light transmitting means to said reflective device in a substantially straight line and said reflective device reflects said second light rays to be within the direct forward line of sight of the vehicle operator.

19. A vehicle rear vision system according to claim 18, wherein each of said mirrorless light transmitting means and said second mirrorless light transmitting means is a prismatic lens and said reflective device includes at least one mirror.

20. A vehicle rear vision system according to claim 18, wherein said reflective device includes a mirror and the system includes only a single reflective device.

* * * * *